United States Patent
Low et al.

(10) Patent No.: US 9,264,450 B2
(45) Date of Patent: Feb. 16, 2016

(54) METHOD OF SEAMLESS POLICY BASED NETWORK DISCOVERY, SELECTION AND SWITCHING

(71) Applicant: Nextwave Technology SDN BHD, Selangor (MY)

(72) Inventors: Swee Leong Low, Selangor (MY); Chin Wee Wong, Selangor (MY); Kamal Bahrin Mohd Jamil, Selangor (MY)

(*) Notice: Subject to any disclaimer, the term of this patent is extended or adjusted under 35 U.S.C. 154(b) by 0 days.

(21) Appl. No.: 14/115,645

(22) PCT Filed: Mar. 21, 2013

(86) PCT No.: PCT/MY2013/000056
§ 371 (c)(1),
(2) Date: Nov. 5, 2013

(87) PCT Pub. No.: WO2013/147587
PCT Pub. Date: Oct. 3, 2013

(65) Prior Publication Data
US 2014/0351880 A1    Nov. 27, 2014

(30) Foreign Application Priority Data
Mar. 26, 2012  (MY) .................. PI 2012700120

(51) Int. Cl.
*G06F 17/00* (2006.01)
*G06F 7/04* (2006.01)
(Continued)

(52) U.S. Cl.
CPC .............. *H04L 63/20* (2013.01); *H04W 12/00* (2013.01); *H04W 48/00* (2013.01); *H04W 12/06* (2013.01)

(58) Field of Classification Search
CPC ..... H04W 48/16; H04W 48/17; H04W 48/18; H04W 48/20
USPC .............. 713/155, 168–171; 726/1–7, 26–30; 370/331–333, 902–911; 455/425, 455/432.1, 435.2–435.3, 436–440, 455/442–444, 525
See application file for complete search history.

(56) References Cited

U.S. PATENT DOCUMENTS 8,565,766 B2 * 10/2013 Scherzer et al. ........... 455/435.2

FOREIGN PATENT DOCUMENTS

WO    2009/149761 A1    12/2009
WO    WO 2009149761 A1 * 12/2009
(Continued)

OTHER PUBLICATIONS

Universal Mobile Telecommunications System (UMTS); LTE; Access Network Discovery and Selection Function (ANDSF) Management Object (MO) (3GPP TS 24.312 version 11.4.0 Release 11) ETSI TS 124 312 V11.4.0 (Oct. 2012).*
(Continued)

*Primary Examiner* — Shewaye Gelagay
*Assistant Examiner* — Trong Nguyen
(74) *Attorney, Agent, or Firm* — Simana Rao, Esq.; Bill Hare, Esq.; McNeely, Hare & War LLP

(57) ABSTRACT

The present invention relates to a method for seamless policy based network discovery, selection and switching of a user equipment (UE), characterized by the steps of: retrieving existing network selection policy information for current UE location; contacting network policy control server of current UE location; performing network authentication procedure with the network policy control server; securing communication channel between the UE and the network policy control server; requesting a network selection policy information; storing the network selection policy information; extracting the network selection policy information; evaluating a first set of UE local operating environment conditions; provisioning the plurality of sets of access point security information on UE; evaluating a second set of UE local operating environment conditions; performing network switch; evaluating a third set of UE local operating environment conditions; establishing a wireless local area network (WLAN) interworking procedures; diagnosing the quality of service of connected network connection.

20 Claims, 8 Drawing Sheets

(51) Int. Cl.
*G06F 15/16* (2006.01)
*G06F 17/30* (2006.01)
*H04L 29/06* (2006.01)
*H04N 7/16* (2011.01)
*H04W 48/00* (2009.01)
*H04W 12/00* (2009.01)
*H04W 12/06* (2009.01)

(56) References Cited

FOREIGN PATENT DOCUMENTS

| WO | 2010/037422 A1 | 4/2010 |
| WO | WO 2010037422 A1 * | 4/2010 |

OTHER PUBLICATIONS

Universal Mobile Telecommunications System (UMTS); LTE; Architecture enhancements for non-3GPP accesses (3GPP TS 23.402 version 10.4.0 Release 10), ETSI TS 123 402 V10.4.0 (Jun. 2011).*

3rd Generation Partnership Project; Technical Specification Group Core Network and Terminals, Access Network Discovery and Selection Function (ANDSF) Management Object (MO) (Release 8), 3GPP TS 24.312 V0.1.0, Oct. 2008, pp. 1-24, http://www.3gpp.org/ftp/specs/html-info/24312.htm.

Universal Mobile Telecommunications System (UMTS); LTE; Architecture enhancements for non-3GPP accesses (3GPP TS 23.402 version 10.4.0 Release 10), ETSI TS 123 402 V10.4.0 (Jun. 2011), pp. 1-233, http://www.etsi.org/deliver/etsi_ts/123400_123499/123402/10.04.00_60/ts_123402v100400p.pdf.

PCT/ISA/210 for PCT/MY2013/000056; mailed May 23, 2013.

* cited by examiner

METHOD OF SEAMLESS POLICY BASED NETWORK DISCOVERY, SELECTION AND SWITCHING

BACKGROUND OF THE INVENTION

1. Field of the Invention

The present invention relates to a user equipment (UE) adapted for automating discovery, selection and connection to one or more target networks, and more particularly to a method of storing, extracting and evaluating network selection policies and local operating environment conditions for resolving network selection prior to select an appropriate target network.

2. Description of Related Arts

With more smart computing devices overwhelming the digital industries these days such as smartphones and tablets, have increase the demand for ubiquitous and spontaneous mobile data access by mobile subscribers. Hence, this scenario requires intelligent network discovery and selection with enhanced mobility support in maintaining a good mobile connectivity experience. However, the unpredictable, simultaneous and sporadic connectivity behaviors of mobile subscribers have caused fluctuation in mobile data demand and congestion within the mobile network. Therefore, the increasing demand to control and relieve mobile network congestion has spurred the development of various mobile data offloading solution in the wireless telecommunication industry.

Third Generation Partnership Project (3GPP) has defined Access Network Discovery and Selection Function (ANDSF) in 3GPP TS 23.402 "Architecture enhancements for non-3GPP accesses" as a method for communication service providers to influence the discovery and selection of target wireless network in user equipment by propagating network policy from a network policy control server to user equipment. A network policy contains information such as the preferred type of wireless network available in a location, the preferred time and/or location to use such wireless network and the network traffic routing rules. This mechanism may allow offloading of data traffic from cellular network to home and/or enterprise network and reducing the congestion in cellular network. However, the method to evaluate network policy against local operating environment conditions for appropriate network selection within the user equipment is yet undefined.

Third Generation Partnership Project (3GPP) has defined 3GPP TS 23.234 "3GPP system to Wireless Local Area Network Interworking (I-WLAN)" as a method to allow user equipment to access mobile data services from a wireless local area network (WLAN). However, this method neither describes under what circumstances should the user equipment use I-WLAN nor a method within the user equipment to activate and deactivate I-WLAN function.

International Publication WO 2010/037422 A1 disclosed a policy server operates to configure differentiated services over multi-protocol label switching (MPLS) in a communication network. The policy server in the cited publication enables the definition and deployment of a customer policy, a network policy and a mapping policy. The policy server is arranged to create a group of MPLS tunnels, and associate the tunnels to the mapping policy and the customer policy. The customer policy includes a tunnel group identifier and a tunneling mode, and maps customer traffic to MPLS tunnels. The policy server translates the customer policy, the network policy and the mapping policy into device specific commands, and then deploys the device specific commands to the network interfaces of the affected network devices. The cited publication however does not disclose a method for a mobile device to seamlessly discover, select and switch network connection.

International Publication WO 2009/149761 A1 disclosed a method of transparently monitoring targeted signal flows, comprising directing control plane signals according to policies associated with the control plane signals through a routing point in a network to a signalling monitoring point in the network. Then the method further comprising substituting bearer flow address information contained in the control plane signals with bearer flow address information of a media processing point in a manner causing subsequent bearer channel flows associated with the control plane signal to be directed to the media processing point from the routing point by destination based routing. However, the cited publication does not provide a method for seamlessly discover, select and switch network connection by taking into considerations such as cellular network identifier, time and location of a user equipment and the state of the candidate target network.

US Patent Publication 2007/0268516 A1 disclosed an automatically policy based network device configuration and network deployment. The cited publication provide system, device, method, computer program and computer program product which associated with the auto configuration and deployment of any number of network devices such as wireless network switches and access point coupled to the network switches. The method starts with activating the device, sending a configuration data set request massage from the requested device, the request including requester information. Then receiving the configuration data set request by a manager system coupled with the network. Then the manager system selecting device, and communicating the selected or generated configuration data set to the requesting device. Finally the requesting device receives the selected or generated configuration data set and loading the configuration storage within the device. However, the method in the cited publication does not disclose a method within user equipment to use configuration data set for seamless network discovery, selection and switching.

Accordingly, it can be concluded in the prior arts that there exists a need to provide a method integrated to a user equipment such as network computers and mobile devices in implementing specific mobile data offloading solution to enable a handsfree mobile connectivity experience by automating network discovery, selection and switching.

SUMMARY OF INVENTION

It is an objective of the present invention to provide a method for automating discovery, selection and connection to one or more target wireless networks based on network selection policy propagated from a network policy control server in a user equipment.

It is also an objective of the present invention to provide a method to store, extract and evaluate network selection policy on a user equipment against the local operating environment conditions of the user equipment during the network discovery and selection process.

It is yet another objective of the present invention to provide a method in the user equipment to automate the connection and disconnection from a wireless local area network (WLAN) capable to access mobile data services located within communication service provider's mobile packet core network.

Accordingly, these objectives may be achieved by following the teachings of the present invention. The present invention relates to a method for seamless policy based network discovery, selection and switching of a user equipment (UE), characterised by the steps of: retrieving existing network selection policy information for current UE location; contacting network policy control server of current UE location; performing network authentication procedure with the network policy control server; securing communication channel between the UE and the network policy control server; requesting a network selection policy information; storing the network selection policy information; extracting the network selection policy information; evaluating a first set of UE local operating environment conditions; provisioning the plurality of sets of access point security information on UE; evaluating a second set of UE local operating environment conditions; performing network switch; evaluating a third set of UE local operating environment conditions; establishing a wireless local area network (WLAN) interworking procedures; diagnosing the quality of service of connected network connection.

BRIEF DESCRIPTION OF THE DRAWINGS

The features of the invention will be more readily understood and appreciated from the following detailed description when read in conjunction with the accompanying drawings of the preferred embodiment of the present invention, in which.

DETAILED DESCRIPTION OF THE INVENTION

Figure 1:
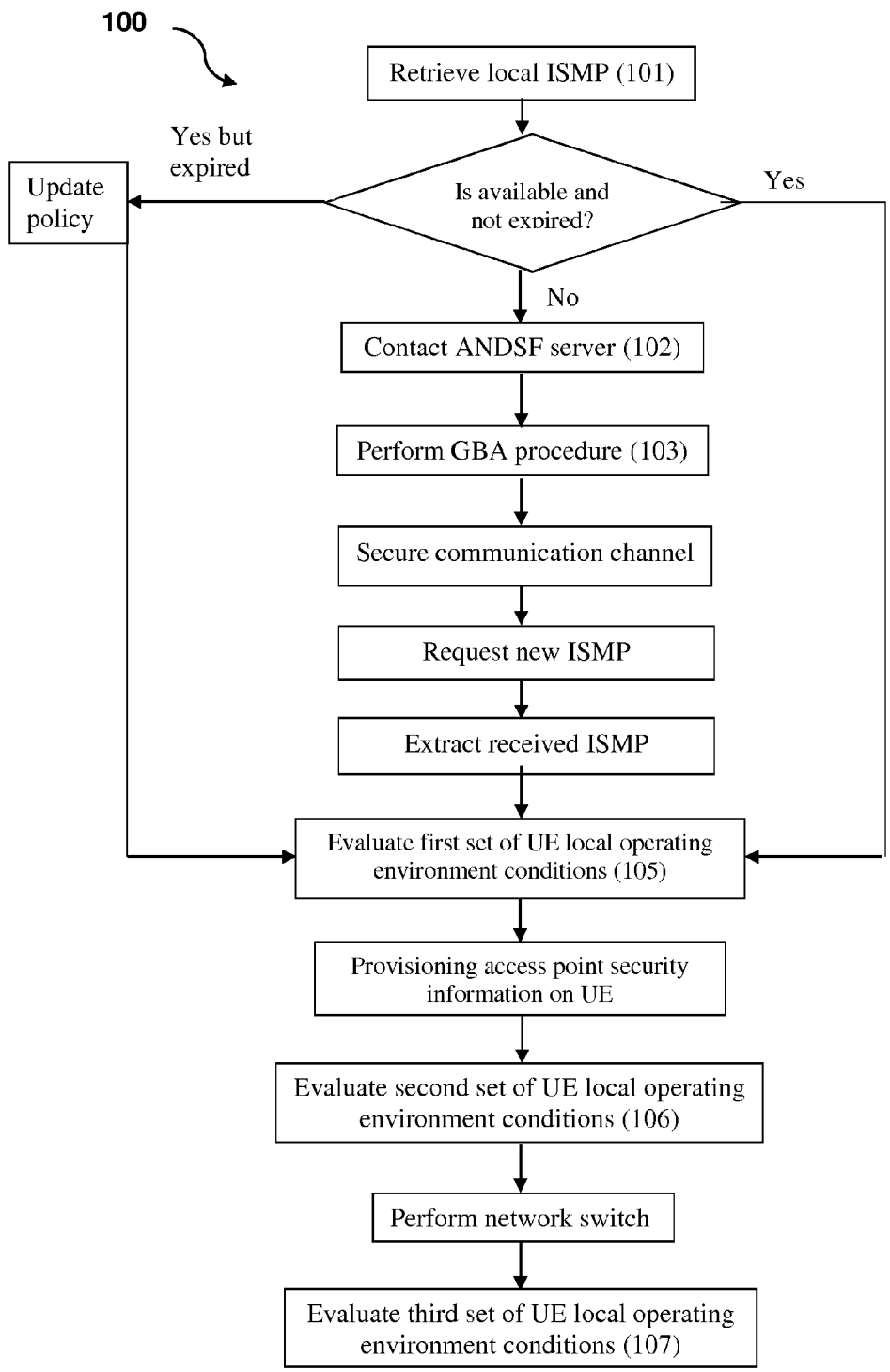
FIG. 1 is a flow chart of the method for seamless policy based network discovery, selection and switching of a UE.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modification, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations of technical terms are used, these indicate the commonly accepted meanings as known in the technical field. For ease of reference, common reference numerals will be used throughout the figures when referring to the same or similar features common to the figures. The present invention will now be described with reference to FIGS. 1-8.

The present invention relates to a method for seamless policy based network discovery, selection and switching of a user equipment (UE), characterised by the steps of:

retrieving existing network selection policy information for current UE location stored on the UE;

contacting network policy control server of current UE location if existing network selection policy information for current UE location is not available or expired on the UE;

performing network authentication procedure with the network policy control server;

securing communication channel between the UE and the network policy control server using an encryption method derived from the network authentication procedure if the network policy control server request a secured channel;

requesting a network selection policy information from the network policy control server;

storing the network selection policy information received from the network policy control server;

extracting the network selection policy information received from the network policy control server wherein the network selection policy information is comprises of rule priority, access network type, access network priority, a plurality of sets of validity area conditions, a plurality of sets of validity time conditions and a plurality of sets of access point security information;

evaluating a first set of UE local operating environment conditions by comparing the plurality of sets of validity time conditions with UE local time, comparing the plurality of sets of validity area conditions with UE current location;

provisioning the plurality of sets of access point security information on UE if the UE local time and the UE current location matching within the plurality of sets of validity time condition and the plurality of sets of validity area condition;

evaluating a second set of UE local operating environment conditions by checking UE battery level, then evaluating signal strength of the discovered networks and evaluating type of the discovered networks;

performing network switch;

evaluating a third set of UE local operating environment conditions by checking internet accessibility;

establishing a wireless local area network (WLAN) interworking procedures;

diagnosing the quality of service of connected network connection.

In a preferred embodiment of the method for seamless policy based network discovery, selection and switching, if existing network selection policy information for current UE location is available and within validity time, then the step of evaluating the local operating environment for the existing network selection policy information is executed.

In a preferred embodiment of the method for seamless policy based network discovery, selection and switching, if the network selection policy information for existing UE location is not available or expired, the network selection policy information is updated by requesting current UE location from the network policy control server.

In a preferred embodiment of the method for seamless policy based network discovery, selection and switching, the step of contacting network policy control server includes constructing and obtaining Full Qualified Domain Name (FQDN) or Internet Protocol (IP) address of the network policy control server via Domain Name System (DNS), Dynamic Host Configuration Protocol (DHCP) query or retrieving from UE local storage.

In a preferred embodiment of the method for seamless policy based network discovery, selection and switching, the step of requesting a network selection policy information comprises requesting the network selection policy information from a network policy control server.

In a preferred embodiment of the method for seamless policy based network discovery, selection and switching, the step of requesting the network selection policy information includes acquiring current UE location and UE local time.

In a preferred embodiment of the method for seamless policy based network discovery, selection and switching, the rule priority includes more than one valid network selection policy information rules.

In a preferred embodiment of the method for seamless policy based network discovery, selection and switching, the network selection policy information includes one or more Inter System Mobility Policy (ISMP) rules that contain the access network type, access network priority and validity time condition.

In a preferred embodiment of the method for seamless policy based network discovery, selection and switching, the network selection policy information includes one or more Discovery Information that contain the alternative type of network associated with its network identifier.

In a preferred embodiment of the method for seamless policy based network discovery, selection and switching, the UE treats rule with lowest rule priority value as the rule having highest priority among the valid network selection policy information rules. In a preferred embodiment, the rule treated by the UE is an ISMP rule.

In a preferred embodiment of the method for seamless policy based network discovery, selection and switching, if the UE finds multiple rules having same rule priority value, a first encountered rule is selected.

In a preferred embodiment of the method for seamless policy based network discovery, selection and switching, the step of comparing the plurality of sets of validity time conditions with UE local time comprises validating that time of day in the local time zone indicated by the UE matches a minimum one time interval indicated in the plurality of sets of validity time conditions. The plurality of sets of validity time conditions is preferably extracted from ISMP.

In a preferred embodiment of the method for seamless policy based network discovery, selection and switching, the step of comparing the plurality of sets of validity area condition with UE current location is by matching the UE current network or location identifier to a $3^{rd}$ Generation Partnership Project (3GPP) Network Cell Identifier. For example, in a preferred embodiment the Generation Partnership Project (3GPP) Network Cell Identifier are GERAN CI, UTRAN CI and EUTRA CI or Worldwide Interoperability for Microwave Access (WiMAX) Base Station Identifier (BSID) or Wireless Local Area Network (WLAN) Service Set Identifier (SSID) or Geographical Location indicated in Global Positioning System (GPS) coordinates.

In a preferred embodiment of the method for seamless policy based network discovery, selection and switching, the step of evaluating signal strength of the discovered networks comprises comparing signal strength of the network between all the discovered networks.

In a preferred embodiment of the method for seamless policy based network discovery, selection and switching, the step of evaluating type of the discovered networks comprises checking the type of the wireless network access point.

In a preferred embodiment of the method for seamless policy based network discovery, selection and switching, the step of checking of Internet accessibility includes executing the procedure of requesting Hypertext Transfer Protocol (HTTP) and testing the reachability of a host on an Internet Protocol network by sending a HTTP Get request toward a host located on the Internet.

In a preferred embodiment of the method for seamless policy based network discovery, selection and switching, if UE failed to obtain Internet accessibility, then the step of evaluating signal strength of all discovered network is repeated.

In a preferred embodiment of the method for seamless policy based network discovery, selection and switching, the step of establishing WLAN interworking procedures includes checking of the connected WLAN is a 3GPP Interworking WLAN (I-WLAN) and initiating I-WLAN procedure.

In a preferred embodiment of the method for seamless policy based network discovery, selection and switching, the step of initiating I-WLAN procedure is by contacting Packet Data Gateway (PDG).

In a preferred embodiment of the method for seamless policy based network discovery, selection and switching, the step of diagnosing the quality of service of connected network connection includes measuring data upload bit rate, download bit rate, bit error rate and internet protocol (IP) packet round-trip time.

In a preferred embodiment of the method of seamless policy based network discovery, selection and switching, the network policy control server is refers to an Access Network Discovery and Selection Function (ANDSF) server. The ANDFS server pushes network selection policy to ANDSF client located within or outside of communication service provider's network. In a preferred embodiment, The ANDSF is refers to network discovery and selection solution described in a document by 3GPP in TS 23.402 V10.5.0 (2011-09)"Architecture enhancements for non-3GPP accesses". Release 10.

In a preferred embodiment of the method of seamless policy based network discovery, selection and switching, the network selection policy information is refers as Inter System Mobility Policy (ISMP), Inter System Routing Policy (ISRP) and Discovery Information described in a 3GPP document TS 24.312 V10.4.0 (2011-09), "Access Network Discovery and Selection Function (ANDSF) Management Object (MO)", Release 10.

In a preferred embodiment of the method for seamless policy based network discovery, selection and switching, a default network selection policy information is provisioned upon installation of computer program on UE.

In a preferred embodiment of the method of seamless policy based network discovery, selection and switching, the default network selection policy information comprising a rule priority, access network type and access network priority. The rule priority may be an ISMP rule.

In a preferred embodiment of the method of seamless policy based network discovery, selection and switching, the default policy is selected when no valid network selection policy information exists on UE.

In a preferred embodiment of the method of seamless policy based network discovery, selection and switching, the network authentication procedure is refers to Generic Bootstrapping Authentication (GBA) procedure described in a 3GPP document TS33.220 V10.0.0 (2010-10) "Generic Authentication Architecture (GAA); Generic Bootstrapping Architecture (GBA)", Release 10.

In a preferred embodiment with reference to FIG. 1, the step of retrieving existing network selection policy information for current UE location stored on the UE is retrieving a local inter-system mobility policy (ISMP) (101). In a preferred embodiment, a default ISMP is provisioned upon installation of computer program on the UE. The ISMP information consists of a set of one or more ISMP rules. At any point of time there shall be at most one rule applied, that rule is referred to as the 'active' rule. There may hence be zero or one 'active' rule. The rules have a number of conditions (e.g. access technology type, access network priority, time and location) where one or more may be present and set to a value. The rules also have a number of results (e.g. preferred access) to be used whenever a rule is 'active'. Irrespective of whether any rule is 'active' or not, the UE shall periodically re-evaluate network selection policy information. When policy selection rules identify an available network, the highest priority rule becomes the 'active' rule and network re-selection is performed. While the rule remains 'active', the UE shall keep considering higher priority networks, than currently selected, in the prioritized network list of the rule. In addition to conditions and results there is a rule-priority that shall be set for each rule in order for the UE to determine which rule, out of potentially several valid rules, it should be consider as 'active'. The trigger for (re-)evaluating rules is that the 'active' rule becomes invalid (conditions no longer fulfilled), or UE detected change of its location by detecting the change of 3GPP Cell Identifier, WIMAX Base Station Identifier or Global Positioning System coordinates. The validity of the policy takes into account the plurality of sets of validity area conditions, roaming, and the plurality of sets of validity time conditions, which must all match in order to make the policy valid.

In a preferred embodiment with reference to FIG. 1, the step of contacting network policy control server of current UE location is the step of contacting an Access Network Discovery and Selection Function (ANDSF) server (102) in the current UE mobile network. ANDSF is a feature defined under 3GPP starting Release 8 with the objective to assist UE in discovering alternative access networks for example Wireless-Fidelity (Wi-Fi) and WiMAX based on policies defined by network operators. ANDSF is created to offload mobile data traffic from mobile networks toward alternative networks such as Wi-Fi and Worldwide Interoperability for Microwave Access (WiMAX) depending on the coverage area. For example, a mobile network cell can be tagged to a list of Wi-Fi hotpots or WiMAX base stations in the same area as alternative networks to access Internet services. ANDSF requires Open Mobile Alliance-Device Management (OMA-DM) support on UE. ANDSF policy containing discovery network information shall be sent to ANDSF-compliant UE at specific locations. In a preferred embodiment, ANDSF policy can also be pre-loaded on device in which this is regarded as default policy. Each ANDSF policy has a validity period and once it is expired, the policy shall be regarded as invalid and shall be renewed.

Figure 2:
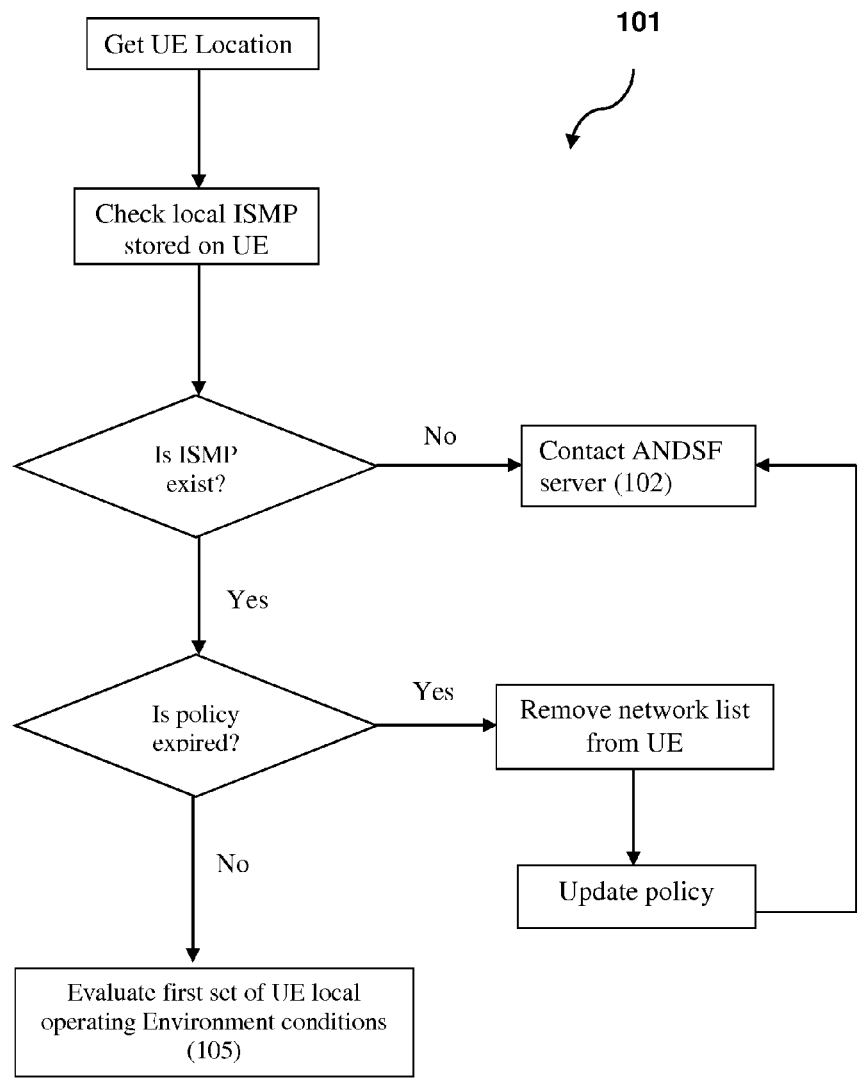
FIG. 2 is a flow chart showing a preferred embodiment of retrieving existing network selection policy information for current UE location stored on the UE.

Referring to FIG. 2, a flow chart of a preferred embodiment for retrieving existing ISMP for current UE location stored on the UE is shown. The step of retrieving existing ISMP starts with getting the UE location and follow by checking whether there is any local ISMP already stored on the UE for current UE location. If ISMP policy exist and is not expired, then proceed to the step of evaluating the first set of UE local operating environment conditions (105). If ISMP policy has expired, the ISMP policy is updated with the local ANDSF server. The WLAN Service Set Identifier (SSID) of local ISMP policy which has expired is removed before contacting ANDSF server of current UE location. If UE failed to update ISMP, then apply the default network selection policy information.

Figure 3:
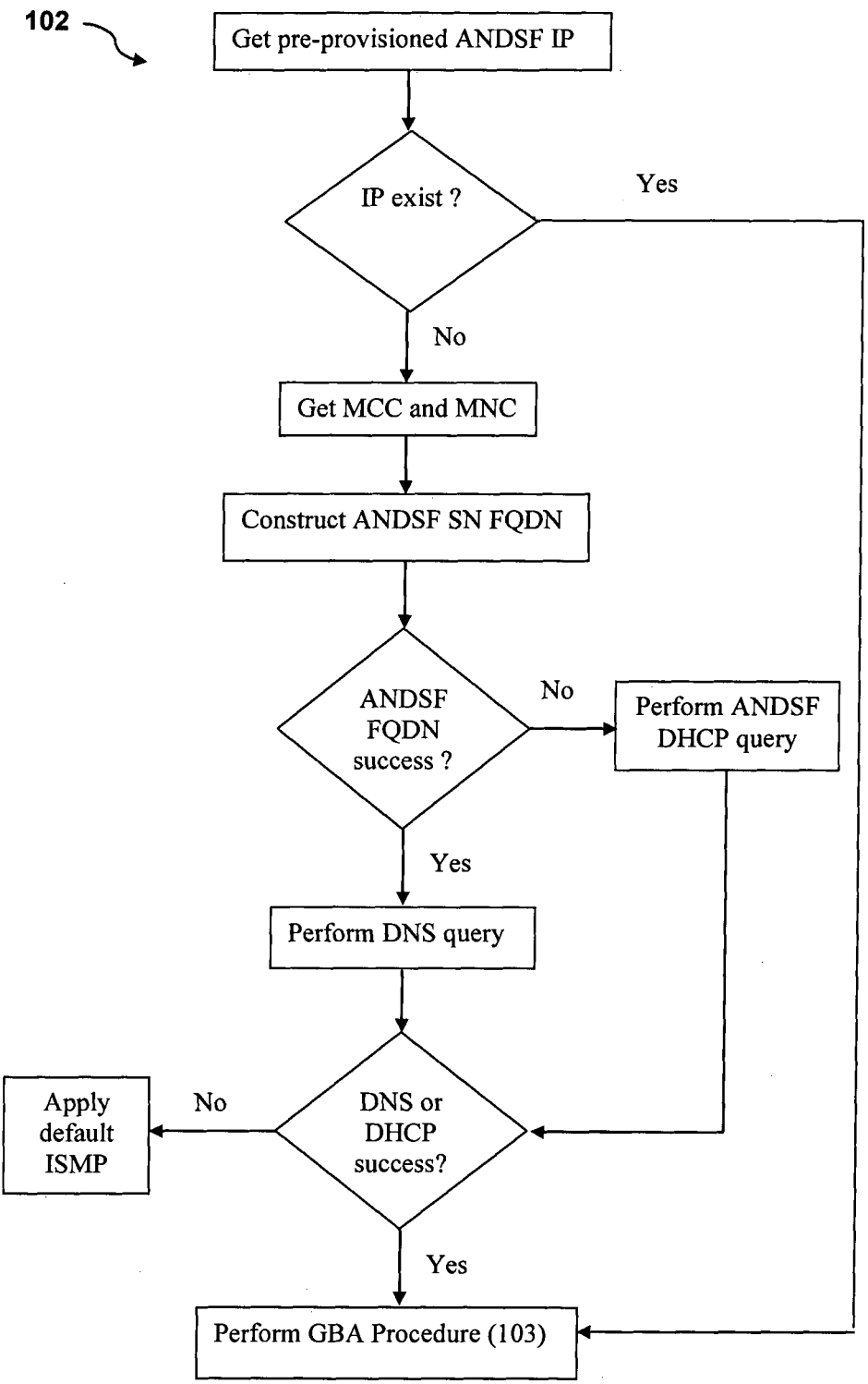
FIG. 3 is a flow chart showing a preferred embodiment of contacting network policy control server of current UE location.

Referring to FIG. 3, a flow chart of a preferred embodiment of contacting network policy control server of current UE network is shown. In a preferred embodiment, the step of contacting network policy control server of current UE location is the step of contacting the ANDSF server (102). In a preferred embodiment, the step of contacting the ANDSF server (102) starts with getting a pre-provisioned ANDSF Internet Protocol (IP). In a preferred embodiment, the UE may initiate the provision of information from the ANDSF, using a client initiated session alert message of code "Generic Alert". In a preferred embodiment, The ANDSF may initiate the provision of information from the ANDSF to the UE as specified in 3GPP TS 24.302 [3AA]. If the pre-provisioned ANDSF IP is exist, then proceed to performing network authentication procedure with the network policy control server. If the pre-provisioned ANDSF IP is not exist, then obtaining a Mobile Country Code (MCC) and Mobile Network Code (MNC), then constructing the server Full Qualified Domain Name (FQDN) or querying Internet Protocol (IP) address via DNS or DHCP query. If fail to perform DNS or DHCP query, then apply the default network selection policy information. In a preferred embodiment, the default network selection policy information is a default ISMP. If successfully perform DNS or DHCP query, and then proceed to performing network authentication procedure with the network policy control server.

In a preferred embodiment with reference to FIG. 1, the step of performing network authentication procedure with the network policy control server is a step of performing Generic Bootstrapping Authentication (GBA) procedure (103). GBA is a technology that enable authentication of a user. GBA procedure is performed to secure bootstrapping functionality between UE, mobile network operators and various application servers. In a preferred embodiment, instead of asking the network service provider to trust a Bootstrapping Server Function (BSF) and relying on it for every authentication request, the BSF establishes a shared secret between the subscriber identification module (SIM) card and the network service provider. This shared secret is limited in time and for a specific domain.

Figure 4:
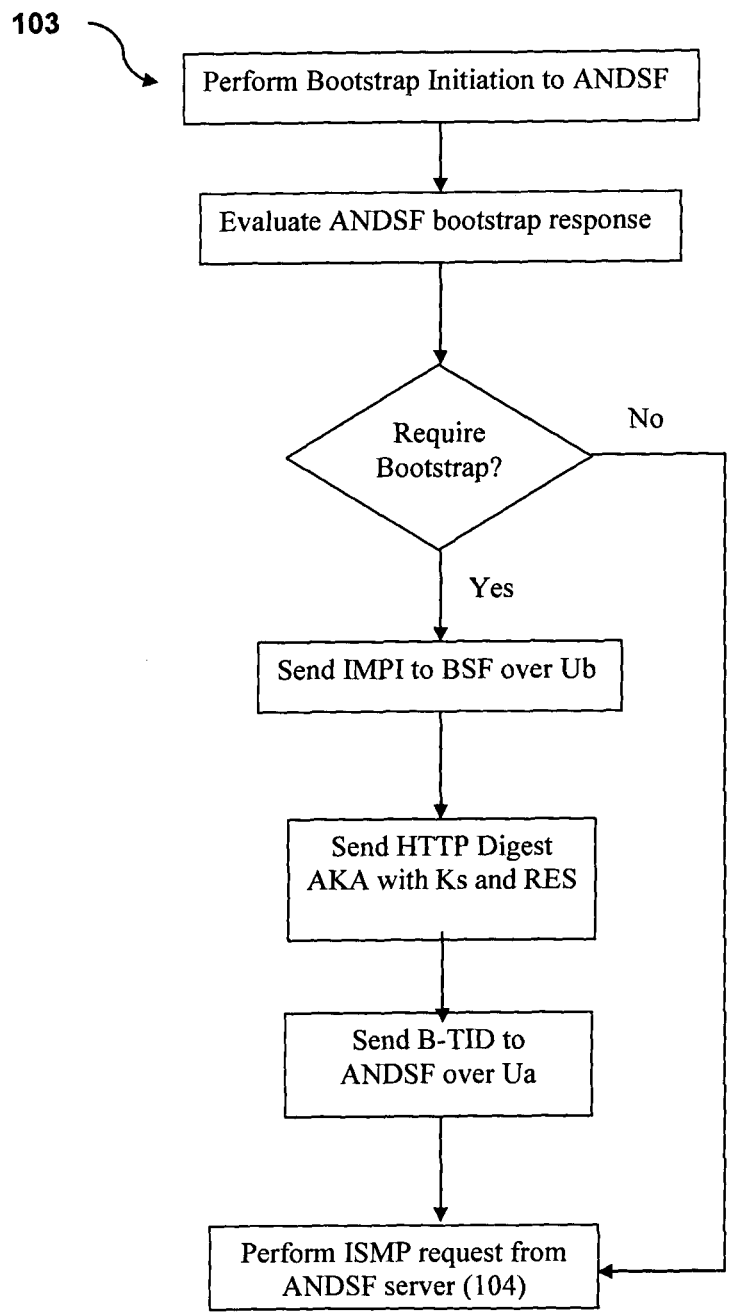
FIG. 4 is a flow chart showing a preferred embodiment of performing network authentication procedure with the network policy control server.

Referring to FIG. 4, a flow chart of a preferred embodiment of performing network authentication procedure with the network policy control server is shown. In a preferred embodiment, the step of performing GBA procedure starts with performing bootstrap initiation to ANDSF server. Then evaluating ANDSF bootstrap response to check whether bootstrapping is required or not. If bootstrapping is required, then send IP Multimedia Private. Identity (IMPI) to the BSF over Ub. In a preferred embodiment and those skills in the art will appreciate that Ub is a reference point between the UE and the BSF. In a preferred embodiment, requirements on reference point Ub are that the BSF shall be able to identify the UE; the BSF and the UE shall be able to authenticate each other based on Authentication and Key Agreement (AKA). Then, proceed with sending HTTP digest authentication with Ks (long term key derived from Permanent key stored in Home Subscriber Server and SIM card, shared by BSF and GBA Client) and responses (RES). Then as shown in FIG. 4, the step is followed by sending Bootstrapping Transaction IDentifier (B-TID) to ANDSF server over Ua. In a preferred embodiment, Ua is an interface, between client and server application. Then, proceed to requesting the network selection policy information from the network policy control server.

In a preferred embodiment, the step of securing communication channel between the UE and the network policy control server is required only if the network policy control server request a secured channel by using an encryption method derived from the network authentication procedure. In a preferred embodiment, the UE establishing a secured communication channel with BSF is by using a Hypertext Transfer Protocol over Transport Layer Security (HTTPS) described in a 3GPP document TS 33.220 V10.0.0 (2010-10) "Generic Authentication Architecture (GAA): Generic Bootstrapping Architecture (GBA)", Release 10. In a preferred embodiment, the UE establishing a secured communication channel with ANDSF is by using a Hypertext Transfer Protocol over Transport Layer Security (HTTPS) described in a 3GPP document TS 33.222 V10.0.0 (2010-10) "3rd Generation Partnership Project; Technical Specification Group Services and System Aspects; Generic Authentication Architecture (GAA); Access to network application functions using Hypertext Transfer Protocol over Transport Layer Security (HTTPS)", Release 10.

Figure 5:
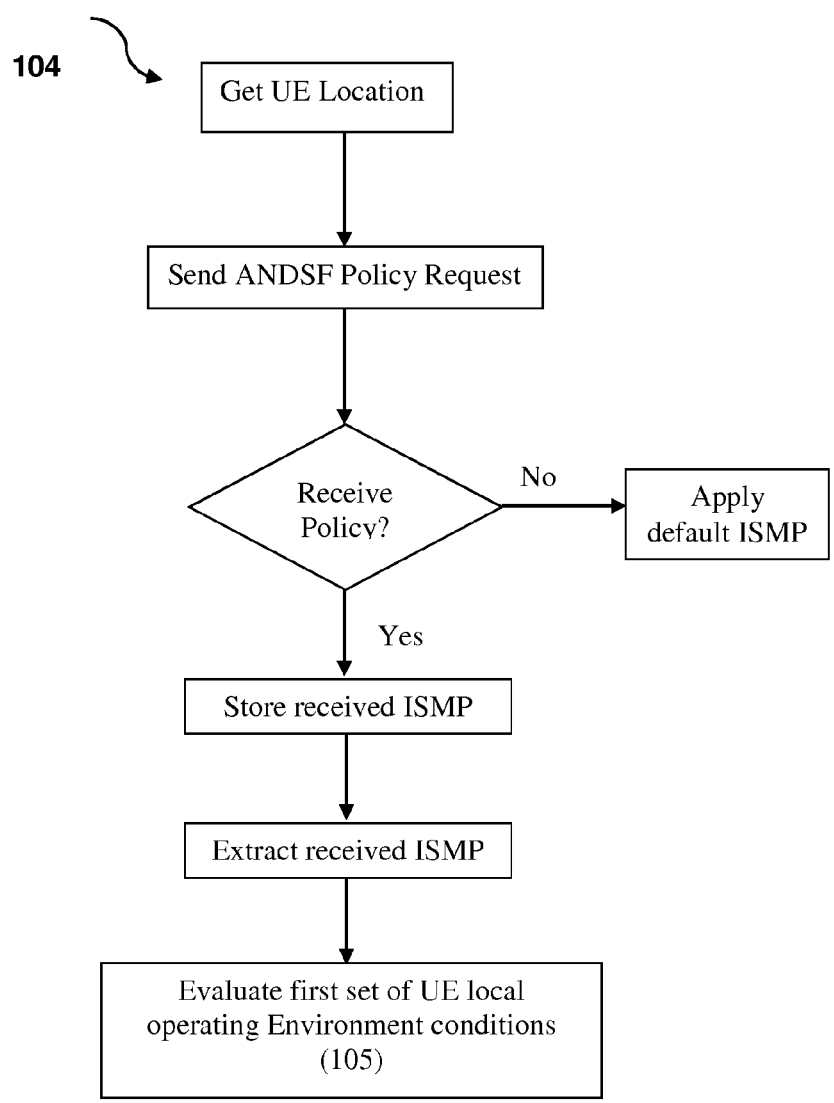
FIG. 5 is a flow chart showing a preferred embodiment of requesting network selection policy information from the network policy control server.

In a preferred embodiment with reference to FIG. 1, the step of requesting a network selection policy information from the network policy control server is a step of performing ISMP request from the ANDSF server (104). Referring to FIG. 5, performing ISMP request from the ANDSF server (104) starts with getting the device (UE) current location before sending ANDSF policy request to the ANDSF server to request ISMP for current location. If fail to receive ISMP policy for current location, then apply the default ISMP provisioned on the UE. Otherwise, proceed to the step of extracting the network selection policy information received from the network policy control server.

Referring to FIG. 1, the step of extracting the network selection policy information received from the network policy control server is the step of extracting received ISMP for current location from the ANDSF server. The ISMP received comprises of rule priority, access network type, access network priority, a plurality of sets of validity area conditions, a plurality of sets of validity time conditions and a plurality of sets of access point security information. Then, proceed to the step of evaluating a first set of UE local operating environment conditions.

Then, evaluating the first set of UE local operating environment conditions is first by comparing the plurality of sets of validity time conditions with UE local time. In a preferred embodiment with reference to FIG. 6, the UE shall consider the plurality of sets of validity time conditions only if the time of day in the current time zone, as indicated by the UE local time, matches at least one time interval indicated in the plurality of sets of validity time conditions. If the UE does not support calendar or clock application, then it does not need to interpret the plurality of sets of validity time conditions.

In a preferred embodiment, in case more than one valid ISMP rule exists, the UE shall treat the ISMP rule with the lowest rule priority value as the ISMP rule having the highest priority among the valid ISMP rules. If there are overlapping ISMP rules (e.g. by location or validity period), the overlapping ISMP rules should not have the same priority. If the UE finds multiple ISMP rules with the same priority, the first encountered ISMP rule should be selected. If there are no matching access networks according to the ISMP rule, other ISMP rules with the same priority shall be considered. If there are no matching access networks according to any ISMP rule with a certain priority, ISMP rules with lower priority may be considered. If policy of the selected ISMP rule is expired, then update the policy. Otherwise, proceed to evaluate a prioritized access.

In a preferred embodiment, the prioritized access node indicates the preferred access for one particular ISMP rule. In case more than one valid prioritized access are available and if the value of the priority belongs to the range of 1-250, the UE shall consider the access network (with the corresponding access identifier if present) with the lowest AccessNetworkPriority value as the access network (with the corresponding access identifier if present) having the highest priority, as defined in Table 1. In a preferred embodiment, the AccessNetworkPriority value 'Restricted access' (254) indicates an access that should not be used by the UE. The AccessNetworkPriority value 'Forbidden' (255) indicates an access that shall not be used by the UE. The same AccessNetworkPriority value may be used for more than one AccessId and more than one Access Technology. If more than one AccessId or more than one Access Technology with the same value of the AccessNetworkPriority are available, then the UE performs network selection by executing evaluation of second set of UE local operating environment conditions. If the UE is not able to find an access network according to ANDSF policies, the network selection mechanism preferably selected.

TABLE 1

Possible values for the AccessTechnology leaf

| Value | Description |
| --- | --- |
| 0 | Reserved |
| 1 | 3GPP |
| 3 | WLAN |
| 4 | Wi MAX |
| 5-255 | Reserved |

Figure 6:
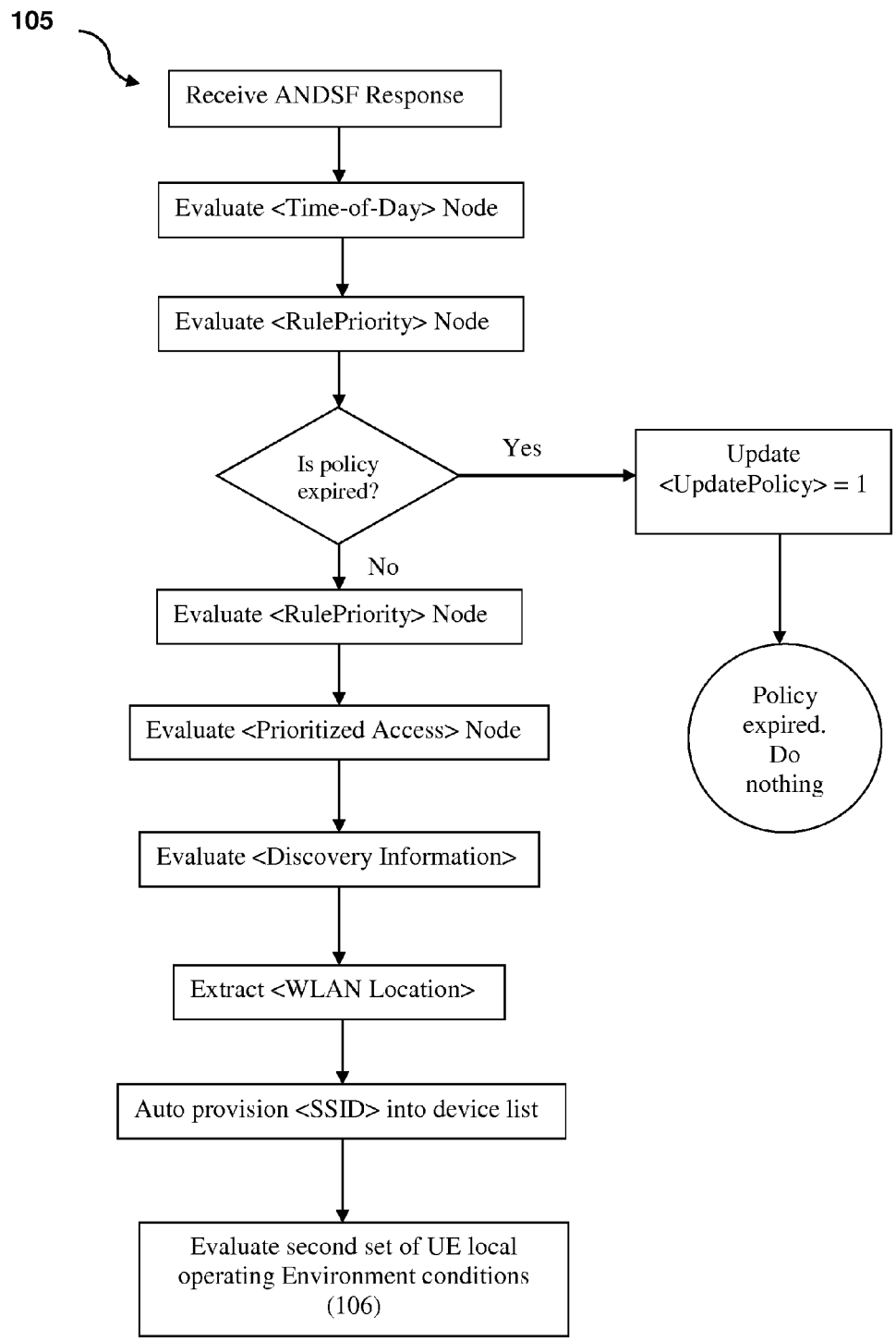
FIG. 6 is a flow chart showing a preferred embodiment of evaluating a first set of UE local operating environment conditions.

In a preferred embodiment with reference to FIG. 6, the step of evaluating the first set of UE local operating environment conditions is continued by evaluating DiscoveryInformation. DiscoveryInformation provides further information for the UE to access the access network defined in the ISMP or in the Inter-System Routing Policy (ISRP). The ISRP information consists of a set of one or more ISRP rules. The network operator may provide information on available access networks through the ANDSF. The UE may use the DiscoveryInformation as an aid in discovering other alternative access networks. DiscoveryInformation comprise of AccessNetworkType and Access Network Area.

In a preferred embodiment, the step of evaluating the first set of UE local operating environment conditions is then continued with comparing the plurality of sets of validity area conditions with UE current location. If the UE is currently aware that it is located in the coverage area described by this node, the UE shall consider the corresponding ISMP rule as valid. In case of overlapping validity domains of multiple policy ISMP rules, RulePriority leaf is used as discriminator. If the UE local time and the UE current location matching within the plurality of sets of validity time condition and the plurality of sets of validity area condition, then, proceed to provision the plurality of sets of access point security information on UE.

Figure 7:
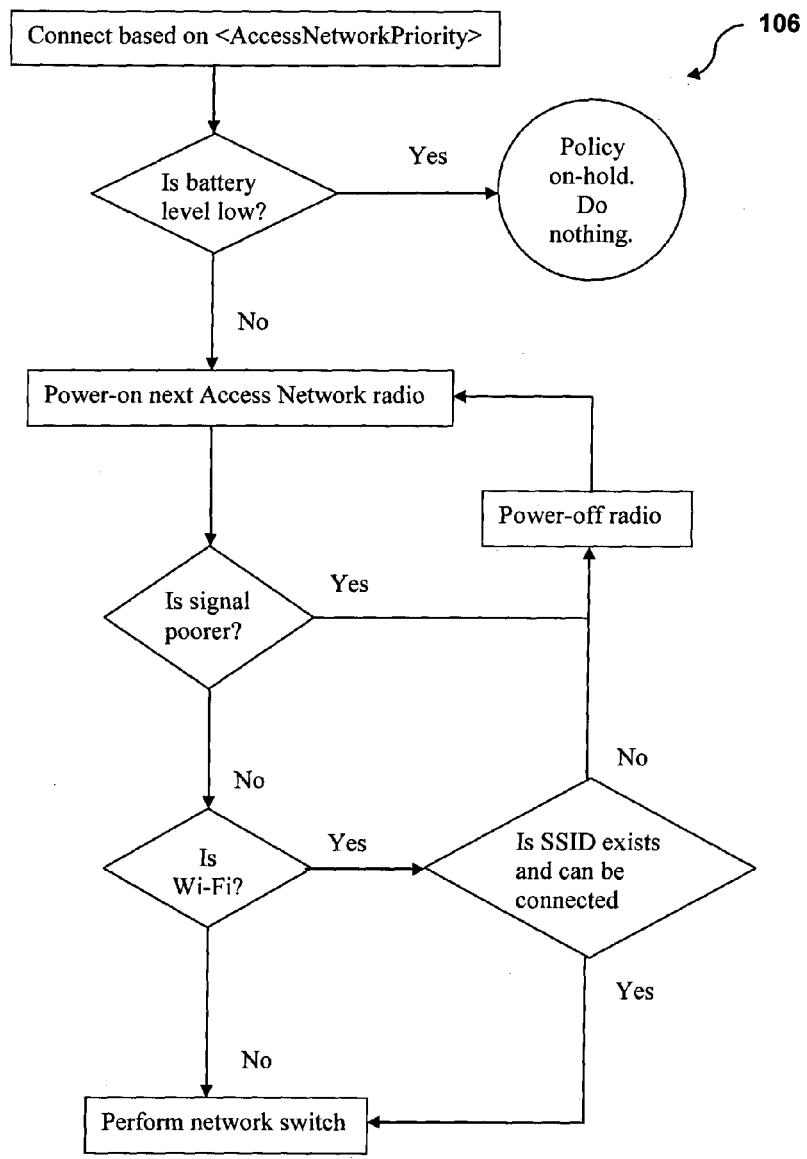
FIG. 7 is a flow chart showing a preferred embodiment of evaluating a second set of UE local operating environment conditions.
Figure 8:
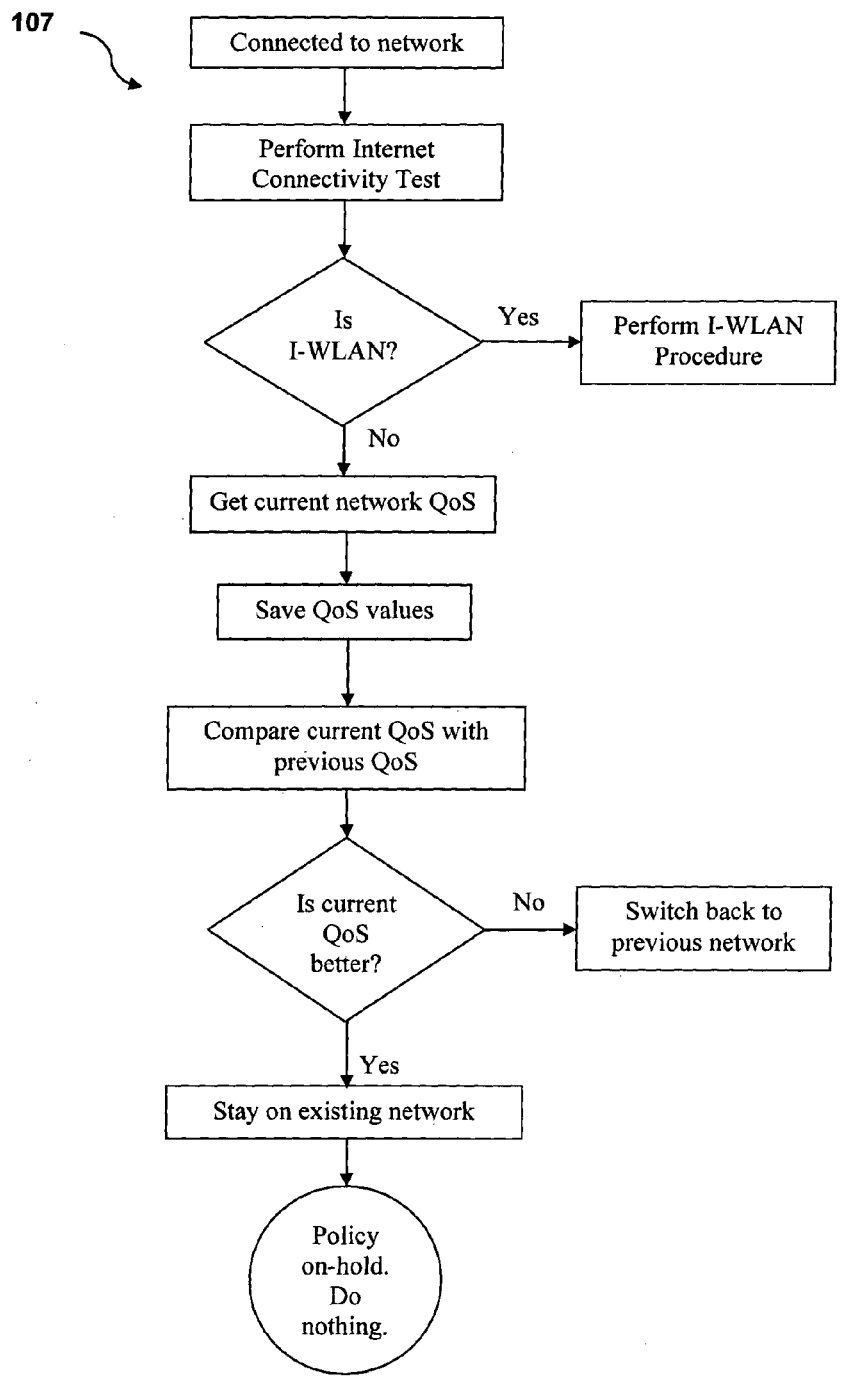
FIG. 8 is a flow chart showing a preferred embodiment of evaluating a third set of UE local operating environment conditions.

After completed evaluating the first set of UE local operating environment conditions, then proceed to evaluate the second set of UE local operating environment conditions as shown in FIG. 7. In a preferred embodiment, the second set of UE local operating environment conditions comprises battery level, signal strength of the discovered networks and type of the discovered networks. In a preferred embodiment, after the UE is connected to the network based on AccessNetwork priority as been determined at the first set of UE local operating environment conditions, the UE checks its battery level at the step of evaluating the second set of UE local operating environment conditions. If the UE battery level falls below a threshold value, the active ISMP policy is put on hold. Otherwise, the UE shall power on next Access Network radio. For example, the Wi-Fi radio has to be switched on before discovering and connecting to any Wi-Fi network.

Then, the UE evaluates the signal strength of all the discovered networks by comparing with the connected network operator at this time. If other discovered networks have poorer signal strength in contrast to the existing connected network, then the UE skips to evaluate the next access network. Otherwise, the UE shall evaluate if the best signal strength is a Wireless Local Area Network (WLAN) connection. The network selection logic is based on access network priority indicated in the policy, then compares the signal strength of all discovered network within the same network type, e.g. WLAN is first priority. UE shall compare all discovered WLAN signal, and select the WLAN with the best signal strength.

If a network with the best signal strength is a WLAN, then evaluate if the SSID of the WLAN exists on the UE and evaluate if connection to the WLAN is possible. If SSID of the WLAN does not exist on the UE and connection to the WLAN is not possible, then the UE shall skip and continue to evaluate the next Access Network. Otherwise, the UE shall proceed to perform network switch. On the other hand, if a network with the best signal strength is not a WLAN, then perform network switch to the network having the best signal strength.

In a preferred embodiment, after network switching is performed, the UE evaluates the third set of UE local operating environment conditions. The UE executes Internet accessibility checks on the connected network. The step of checking of Internet accessibility includes executing the procedure of sending Hypertext Transfer Protocol (HTTP) request and testing the reachability of a host on an Internet Protocol network by sending ping toward a server located in the Internet. In a preferred embodiment, the step of executing the procedure of requesting Hypertext Transfer Protocol (HTTP) is by sending a HTTP GET. GET is a request representation of the specified resource. If the UE fails to obtain Internet accessibility of the connected network, then the step of evaluating signal strength of the discovered network connections is repeated. Otherwise, proceed to the step of diagnosing the quality of service of connected network including measuring data upload speed, download speed, bit error rate and internet protocol (IP) packet round-trip time.

In a preferred embodiment after completing the Internet accessibility test, if the connected network is found to be a WLAN and accessible to the Internet, the UE shall check if the WLAN connection is capable of establishing 3GPP Interworking WLAN (I-WLAN) procedure by reaching the Packet Data Gateway (PDG).

In a preferred embodiment, if 3GPP Interworking WLAN (I-WLAN) is established, the communication service provider's packet core network is accessible from any I-WLAN via its Packet Data Gateway (PDG). The subscriber authentication method and security is performed using EAP-SIM or EAP-AKA methods defined in a 3GPP document TS 23.234V10.0.0 (2011-03) "3GPP system to Wireless Local Area Network (WLAN) interworking: system description", Release 10. The data security is ensured by establishing an IP Security tunnel in between the UE and the PDG, providing a tampered-proof communication channel. Therefore, in a preferred embodiment, users on Wi-Fi may still access their favorite mobile packet data services offered by the mobile network operators.

User does not require to search for Wi-Fi access points to connect to available Wi-Fi services. In a preferred embodiment, ANDSF automatically pushes usable Wi-Fi hotspots based on UE current location. Even if the UE has not added the Wi-Fi hotspots before, the method of seamless policy based network discovery, selection and switching presented by current invention may connect an UE to an automatic discovered Wi-Fi hotspot and seamlessly switches from mobile network to Wi-Fi without user manual intervention. Therefore, user no longer need to manually enable Wi-Fi radio, scan for Wi-Fi networks and enter a different set of credentials to access mobile data services from WLAN.

In a preferred embodiment, the method of seamless policy based network discovery, selection and switching presented by current invention can be integrated to any third-party connection manager client running primarily on Android, providing policy-based network switching, seamless subscriber authentication and offers secured data access to operator's value-added services over public or operator-owned Wi-Fi hotspots. In a preferred embodiment, the method of seamless policy based network discovery, selection and switching presented by current invention is compliant to 3GPP-defined specifications. As described above, the method of seamless policy based network discovery, selection and switching allows UE to automatically turn Wi-Fi radio on at specific UE local conditions, connecting UE to usable Wi-Fi network and establish trusted WLAN network such as I-WLAN if available. UE shall be able to retrieve a list of trusted Wi-Fi hotspots nearby from the ANDSF server. Inter-system mobility policy gives priority access to the most preferred networks or restricts certain network access at a particular time and/or location. For example, Wi-Fi is given a higher priority access over 3G at indoor locations.

Below is an example of the method for seamless policy based network switching of a UE from which the advantages of the present invention may be more readily understood. It is to be understood that the following example is for illustrative purpose only and should not be construed to limit the present invention in any way.

EXAMPLES

Include any examples provided by inventor to better explain how to carry out the invention.
Case 1: Operator 3G Default Policy
Referring to Table 2, operator encourages postpaid data plan subscribers to use 3G mobile data. This is intended for operator who is actively pushing 3G take up rate.
Case 2: Operator Wi-Fi Default Policy
Referring to Table 3, operator encourages subscribers to use its Wi-Fi or partnered Wi-Fi over 3G. Operator's or Partner's Wi-Fi uses the same SSID at all coverage areas. This is intended for operator who wants to promote and extend its/partner Wi-Fi service for its subscribers.
Case 3: Urban Congestion; User Wi-Fi Preferred
Referring to Table 4, operator does not deploy Wi-Fi but encourages subscribers to use their home or office Wi-Fi over its 3G at urban locations. Operator does not know user home or office SSID. (Without Discovery Information)

Case 4: Partner/Enterprise Wi-Fi Preferred with Discovery Information
  With reference to Table 5.
  Scenario 1. Operator leverages on Wi-Fi partner to provide Wi-Fi service. Operator tags Wi-Fi partner SSIDs to its 3GPP locations.
  Scenario 2. Operator leverages on Wi-Fi partner to provide Wi-Fi service. Operator tags Wi-Fi partner SSIDs with GPS locations.
  Scenario 3. Operator launches enterprise plan. Enterprise provides operator its corporate SSID and map to its 3GPP locations. Preference to use corporate SSID during office hours.
  Scenario 4. Operator launches enterprise plan. Enterprise provides operator its corporate SSID in GPS locations.

Case 5: Operator Congestion Control
  With reference to Table 6 and Table 7.
  Scenario 1: Operator restricts 3G data usage (relieve more radio channels for voice/SMS) during a scheduled concert or soccer match in an area.
  Scenario 2: Operator forbids 3G data usage due to heavy congestion.

Case 6: Conflicting Policy Handling
General Conflict Management
  If two or more policies have the same validity conditions, the rule priority takes precedence.
  If policies have the same rule priorities, it depends on whether which policy is evaluated and accepted first. The accepted policy shall be enforced.

TABLE 2

Case 1: Operator 3G Default Policy

| | | ISMP | | | | | Local | | | |
| | | Prioritized Access | | | Time of Day | | Discovery | Conditions | | |
| # | Start State | 3GPP | Wi-Fi | Access ID | Locations 3GPP | Time Start | Time Stop | Info Wi-Fi | Wi-Fi Signal | Battery | End State Expected Behavior |
| --- | --- | --- | --- | --- | --- | --- | --- | --- | --- | --- | --- |
| 1 | Not connected | 1 | 2 | — | — | — | — | — | >−85 dbm | >20% | Auto-enable 3G data |
| 2 | Not connected | 1 | 2 | — | — | — | — | — | >−85 dbm | <20% | Auto-enable Wi-Fi radio, connect to "saved" Wi-Fi |
| 3 | Not connected | 1 | 2 | — | — | — | — | — | <−85 dbm | >20% | Auto-enable 3G data |
| 4 | Not connected | 1 | 2 | — | — | — | — | — | <−85 dbm | <20% | Do not connect |
| 5 | 3G | 1 | 2 | — | — | — | — | — | >−85 dbm | >20% | Stay on 3G |
| 6 | 3G | 1 | 2 | — | — | — | — | — | >−85 dbm | <20% | Auto-enable Wi-Fi radio, connect to "saved" Wi-Fi |
| 7 | Wi-Fi | 1 | 2 | — | — | — | — | — | >−85 dbm | >20% | Switch to 3G data |
| 8 | Wi-Fi | 1 | 2 | — | — | — | — | — | >−85 dbm | <20% | Stay on Wi-Fi |

TABLE 3

Case 2: Operator Wi-Fi Default Policy

| | | ISMP | | | | | Local | | | |
| | | Prioritized Access | | | Time of Day | | Discovery | Conditions | | |
| # | Start State | 3GPP | Wi-Fi | Access ID | Locations 3GPP | Time Start | Time Stop | Info Wi-Fi | Wi-Fi Signal | Battery | End State Expected Behavior |
| --- | --- | --- | --- | --- | --- | --- | --- | --- | --- | --- | --- |
| 1 | Not connected | 2 | 1 | <SSID> | — | — | — | — | >−85 dbm | >20% | Auto-connect to <SSID> |
| 2 | Not connected | 2 | 1 | <SSID> | — | — | — | — | >−85 dbm | <20% | Auto-connect to <SSID> |
| 3 | Not connected | 2 | 1 | <SSID> | — | — | — | — | <−85 dbm | >20% | Auto-connect to 3G data |
| 4 | Not connected | 2 | 1 | <SSID> | — | — | — | — | <−85 dbm | <20% | Do not connect |
| 5 | Wi-Fi <SSID> | 2 | 1 | <SSID> | — | — | — | — | >−85 dbm | >20% | Stay in <SSID> |
| 6 | Wi-Fi <SSID> | 2 | 1 | <SSID> | — | — | — | — | <−85 dbm | >20% | Switch to other "saved" Wi-Fi; Otherwise, switch to 3G data |
| 7 | 3G | 2 | 1 | <SSID> | — | — | — | — | >−85 dbm | >20% | Switch to <SSID> |
| 8 | 3G | 2 | 1 | <SSID> | — | — | — | — | <−85 dbm | >20% | Stay on 3G |

TABLE 4

Case 3: Urban Congestion; User Wi-Fi preferred

| # | Start State | ISMP Prioritized Access 3GPP | ISMP Prioritized Access Wi-Fi | ISMP Access ID | ISMP Locations 3GPP | ISMP Time of Day Time Start | ISMP Time of Day Time Stop | Discovery Info Wi-Fi | Local Conditions Wi-Fi Signal | Local Conditions Battery | End State Expected Behavior |
|---|---|---|---|---|---|---|---|---|---|---|---|
| 1 | Not connected | 2 | 1 | — | Valid | Valid | Valid | — | >−85 dbm | >20% | Auto-enable Wi-Fi, connect to user "saved" Wi-Fi |
| 2 | Not connected | 2 | 1 | — | Valid | Valid | Valid | — | <−85 dbm | >20% | Auto-connect to 3G |
| 3 | 3G | 2 | 1 | — | Valid | Valid | Valid | — | >−85 dbm | >20% | Switch to Wi-Fi, connect to user "saved" Wi-Fi |
| 4 | 3G | 2 | 1 | — | Valid | Valid | Valid | — | <−85 dbm | >20% | Stay on 3G data. |
| 5 | 3G | 2 | 1 | — | Valid | Valid | Valid | — | >−85 dbm | <20% | Switch to Wi-Fi, connect to user "saved" Wi-Fi |
| 6 | 3G | 2 | 1 | — | Valid | Valid | Valid | — | <−85 dbm | <20% | Terminate 3G data. Will not connect to Wi-Fi. |
| 7 | Wi-Fi | 2 | 1 | — | Valid | Valid | Valid | — | >−85 dbm | >20% | Stay on user Wi-Fi. |
| 8 | Wi-Fi | 2 | 1 | — | Valid | Valid | Valid | — | <−85 dbm | >20% | Scan other user "saved" Wi-Fi. Otherwise, switch to 3G data. |
| 9 | Wi-Fi | 2 | 1 | — | Valid | Valid | Valid | — | >−85 dbm | <20% | Stay on user Wi-Fi. |
| 10 | Wi-Fi | 2 | 1 | — | Valid | Valid | Valid | — | <−85 dbm | <20% | Scan other user "saved" Wi-Fi. Otherwise, will not connect. |
| 11 | 3G or Wi-Fi | 2 | 1 | — | Invalid | Invalid or Expired | Invalid or Expired | — | N/A | N/A | Apply default operator policy if any. Otherwise, follow device settings and behavior. |

TABLE 5

Case 4: Partner/Enterprise Wi-Fi Preferred with Discovery Information

| # | Start State | ISMP Prioritized Access 3GPP | ISMP Prioritized Access Wi-Fi | ISMP Access ID | ISMP Locations 3GPP | ISMP Time of Day Time Start | ISMP Time of Day Time Stop | Discovery Info Wi-Fi | Local Conditions Wi-Fi Signal | Local Conditions Battery | End State Expected Behavior |
|---|---|---|---|---|---|---|---|---|---|---|---|
| 1 | Not connected | 2 | 1 | — | Valid | Valid | Valid | <SSID> | >−85 dbm | >20% | First time: Provision <SSID> Auto-enable and connect to <SSID>. |
| 2 | Not connected | 2 | 1 | — | Valid | Valid | Valid | <SSID> | <−85 dbm | >20% | Scan and connect to other user "saved" Wi-Fi. Otherwise, switch to 3G data. |
| 3 | Wi-Fi <SSID> | 2 | 1 | — | Valid | Valid | Valid | <SSID> | >−85 dbm | >20% | Stay on <SSID> |
| 4 | Wi-Fi <SSID> | 2 | 1 | — | Valid | Valid | Valid | <SSID> | <−85 dbm | >20% | Scan and connect to other user "saved" Wi-Fi. Otherwise, switch to 3G data. |
| 5 | Other Wi-Fi | 2 | 1 | — | Valid | Valid | Valid | <SSID> | >−85 dbm | >20% | Switch to <SSID> |
| 6 | Other Wi-Fi | 2 | 1 | — | Valid | Valid | Valid | <SSID> | <−85 dbm | >20% | Stay on current Wi-Fi. |
| 7 | Wi-Fi <SSID> | 2 | 1 | — | Valid | Expired | Expired | <SSID> | >−85 dbm | >20% | Apply default policy, if any. Otherwise, follow device behavior. Deprovision <SSID>. |

TABLE 5-continued

Case 4: Partner/Enterprise Wi-Fi Preferred with Discovery Information

| # | Start State | ISMP Prioritized Access 3GPP | ISMP Prioritized Access Wi-Fi | ISMP Access ID | ISMP Locations 3GPP | Time of Day Time Start | Time of Day Time Stop | Discovery Info Wi-Fi | Local Conditions Wi-Fi Signal | Local Conditions Battery | End State Expected Behavior |
|---|---|---|---|---|---|---|---|---|---|---|---|
| 8 | Other Wi-Fi | 2 | 1 | — | Valid | Expired | Expired | <SSID> | >−85 dbm | >20% | Apply default policy, if any. Otherwise, follow device behavior. Deprovision <SSID>. |
| 9 | 3G | 2 | 1 | — | Valid | Expired | Expired | <SSID> | <−85 dbm | >20% | Apply default policy, if any. Otherwise, follow device behavior. Deprovision <SSID>. |

TABLE 6

Case 5: Operator Congestion Control

| # | Start State | ISMP Prioritized Access 3GPP | ISMP Prioritized Access Wi-Fi | ISMP Access ID | ISMP Locations 3GPP | Time of Day Time Start | Time of Day Time Stop | Discovery Info Wi-Fi | Local Conditions Wi-Fi Signal | Local Conditions Battery | End State Expected Behavior |
|---|---|---|---|---|---|---|---|---|---|---|---|
| 1 | Not connected | 254 | 1 | — | Valid | Valid | Valid | — | >−85 dbm | >20% | Auto-enable Wi-Fi, scan and connect to "saved" Wi-Fi. |
| 2 | Not connected | 254 | 1 | — | Valid | Valid | Valid | — | <−85 dbm | >20% | Auto-enable Wi-Fi, scan and connect to "saved" Wi-Fi. Will not enable 3G data. |
| 3 | 3G | 254 | 1 | — | Valid | Valid | Valid | — | >−85 dbm | >20% | Auto-enable Wi-Fi, scan and connect to "saved" Wi-Fi. Otherwise, stay on 3G data (user forced it). |
| 4 | 3G | 254 | 1 | — | Valid | Valid | Valid | — | <−85 dbm | >20% | Auto-enable Wi-Fi, scan and connect to "saved" Wi-Fi. Otherwise, stay on 3G data (user forced it). |
| 5 | 3G | 254 | 1 | — | Valid | Valid | Valid | — | NA | <20% | Terminate 3G data. Do not connect. |

TABLE 7

Case 5: Operator Congestion Control(Continuation from Table 6)

| # | Start State | ISMP Prioritized Access 3GPP | ISMP Prioritized Access Wi-Fi | ISMP Access ID | ISMP Locations 3GPP | Time of Day Time Start | Time of Day Time Stop | Discovery Info Wi-Fi | Local Conditions Wi-Fi Signal | Local Conditions Battery | End State Expected Behavior |
|---|---|---|---|---|---|---|---|---|---|---|---|
| 1 | Not connected | 255 | 1 | — | Valid | Valid | Valid | — | >−85 dbm | >20% | Auto-enable Wi-Fi, scan and connect to "saved" Wi-Fi. |
| 2 | Not connected | 255 | 1 | — | Valid | Valid | Valid | — | <−85 dbm | >20% | Auto-enable Wi-Fi, scan and connect to "saved" Wi-Fi. Will not enable 3G data. |
| 3 | 3G | 255 | 1 | — | Valid | Valid | Valid | — | >−85 dbm | >20% | Auto-enable Wi-Fi, scan and connect to "saved" Wi-Fi. Terminate 3G |

TABLE 7-continued

Case 5: Operator Congestion Control(Continuation from Table 6)

| | | ISMP | | | | | | Local | | |
| | | Prioritized Access | | | Time of Day | | Discovery | Conditions | | |
| # | Start State | 3GPP | Wi-Fi | Access ID | Locations 3GPP | Time Start | Time Stop | Info Wi-Fi | Wi-Fi Signal | Battery | End State Expected Behavior |
|---|---|---|---|---|---|---|---|---|---|---|---|
| 4 | 3G | 255 | 1 | — | Valid | Valid | Valid | — | <−85 dbm | >20% | Auto-enable Wi-Fi, scan and connect to "saved" Wi-Fi. Terminate 3G data. |
| 5 | 3G | 255 | 1 | — | Valid | Valid | Valid | — | NA | <20% | Terminate 3G data. Do not enable Wi-Fi. |

Description of the reference numerals used in the accompanying drawings according to the present invention:

| Reference Numerals | Description |
|---|---|
| 100 | flow chart of the method for seamless policy based network switching of a UE |
| 101 | flow chart showing a preferred embodiment of retrieving existing network selection policy information for current UE location stored on the UE |
| 102 | flow chart showing a preferred embodiment of contacting network policy control server of current UE location |
| 103 | flow chart showing a preferred embodiment of performing network authentication procedure with the network policy control server |
| 104 | flow chart showing a preferred embodiment of requesting a network selection policy information from the network policy control server |
| 105 | flow chart showing a preferred embodiment of evaluating a first set of UE local operating environment conditions |
| 106 | flow chart showing a preferred embodiment of evaluating a second set of UE local operating environment conditions |
| 107 | flow chart showing a preferred embodiment of evaluating a third set of UE local operating environment conditions |

Although the present invention has been described with reference to specific embodiments, also shown in the appended figures, it will be apparent for those skilled in the art that many variations and modifications can be done within the scope of the invention as described in the specification and defined in the following claims.

We claim:

1. A method for seamless policy based network discovery, selection and switching of a user equipment (UE), comprising the steps of:
   retrieving existing network selection policy information for a current location of the UE stored on the UE;
   contacting network policy control server of the current location of the UE if the existing network selection policy information for the current location of the UE is not available or expired on the UE;
   performing a network authentication procedure with the network policy control server;
   securing communication channel between the UE and the network policy control server using an encryption method derived from the network authentication procedure if the network policy control server requested a secured channel;
   requesting a network selection policy information from the network policy control server;
   storing the network selection policy information received from the network policy control server;
   extracting the network selection policy information received from the network policy control server wherein the network selection policy information comprises of a rule priority, an access network type, an access network priority, a plurality of sets of validity area conditions, a plurality of sets of validity time conditions and a plurality of sets of access point security information;
   evaluating a first set of local operating environment conditions of the UE by comparing the plurality of sets of validity time conditions with a local time of the UE and comparing the plurality of sets of validity area conditions with the current location of the UE;
   provisioning the plurality of sets of access point security information on the UE if the local time of the UE and the current location of the UE matching within the plurality of sets of validity time conditions and the plurality of sets of validity area conditions;
   evaluating a second set of local operating environment conditions of the UE by checking a battery level of the UE, then evaluating signal strength of discovered networks and evaluating type of the discovered networks;
   performing a network switch;
   evaluating a third set of local operating environment conditions of the UE by checking internet accessibility;
   establishing a wireless local area network (WLAN) interworking procedure; and
   diagnosing a quality of service of a connected network connection.

2. A method for seamless policy based network discovery, selection and switching according to claim 1, wherein if the existing network selection policy information for the current location of the UE is available and within a validity time, then the step of evaluating the first set of local operating environment conditions of the UE for the existing network selection policy information is executed.

3. A method for seamless policy based network discovery, selection and switching according to claim 2, wherein if the existing network selection policy information for the current location of the UE is not available or expired, the network selection policy information is updated by requesting the current location of the UE from the network policy control server.

4. A method for seamless policy based network discovery, selection and switching according to claim 1, wherein the step of contacting network policy control server includes constructing and obtaining Full Qualified Domain Name (FQDN) or Internet Protocol (IP) address of the network policy control server via Domain Name System (DNS), Dynamic Host Configuration Protocol (DHCP) query or retrieving from UE local storage.

5. A method for seamless policy based network discovery, selection and switching according to claim 1, wherein the step of requesting the network selection policy information includes acquiring the current location of the UE and the local time of the UE.

6. A method for seamless policy based network discovery, selection and switching according to claim 1, wherein the rule priority includes more than one valid network selection policy information rules.

7. A method for seamless policy based network discovery, selection and switching according to claim 6, wherein the UE treats rule with lowest rule priority value as the rule having highest priority among the valid network selection policy information rules.

8. A method for seamless policy based network discovery, selection and switching according to claim 7, wherein if the UE finds multiple rules having same rule priority value, a first encountered rule is selected.

9. A method for seamless policy based network discovery, selection and switching according to claim 1, wherein the step of comparing the plurality of sets of validity time conditions with the local time of the UE comprises validating a time of day in the local time zone indicated by the UE matches a minimum one time interval indicated in the plurality of sets of validity time conditions.

10. A method for seamless policy based network discovery, selection and switching according to claim 1, wherein comparing the plurality of sets of validity area conditions with the current location of the UE is by matching a current or location identifier of the UE to a 3rd Generation Partnership Project (3GPP) Network Cell Identifier or Worldwide Interoperability for Microwave Access (WiMAX) Base Station Identifier (BSID) or Wireless Local Area Network (WLAN) Service Set Identifier (SSID) or Geographical Location indicated in Global Positioning System (GPS) coordinates.

11. A method for seamless policy based network discovery, selection and switching according to claim 1, wherein the step of evaluating signal strength of the discovered networks comprises comparing signal strength between the discovered networks.

12. A method for seamless policy based network discovery, selection and switching according to claim 1, wherein the step of evaluating type of the discovered networks comprises checking a type of a wireless network access point.

13. A method for seamless policy based network discovery, selection and switching according to claim 1, wherein the step of checking of Internet accessibility includes executing a procedure of requesting Hypertext Transfer Protocol (HTTP) and testing reachability of a host on an Internet Protocol network by sending a HTTP Get request toward a host located on the Internet.

14. A method for seamless policy based network discovery, selection and switching according to claim 13, wherein if UE failed to obtain Internet accessibility, then the step of evaluating signal strength of the discovered networks is repeated.

15. A method for seamless policy based network discovery, selection and switching according to claim 1, wherein the step of establishing WLAN interworking procedures includes checking of the connected WLAN is a 3GPP Interworking WLAN (I-WLAN) and initiating I-WLAN procedure.

16. A method for seamless policy based network discovery, selection and switching according to claim 15, wherein the step of initiating I-WLAN procedure is by contacting Packet Data Gateway (PDG).

17. A method for seamless policy based network discovery, selection and switching according to claim 1, wherein the step of diagnosing the quality of service of connected network connection includes measuring data upload bit rate, download bit rate, bit error rate and internet protocol (IP) packet round-trip time.

18. A method for seamless policy based network discovery, selection and switching according to claim 1, wherein default network selection policy information is provisioned upon installation of computer program on the UE.

19. A method of seamless policy based network discovery, selection and switching according to claim 18, wherein the default network selection policy information comprising a rule priority, access network type and access network priority.

20. A method of seamless policy based network discovery, selection and switching according to claim 19, wherein a default policy is selected when no valid network selection policy information exists on the UE.

\* \* \* \* \*